United States Patent [19]
Takada

[11] Patent Number: 5,892,267
[45] Date of Patent: Apr. 6, 1999

[54] MULTI-STAGE VOLTAGE-BOOSTING CIRCUIT WITH BOOSTED BACK-GATE BIAS

[75] Inventor: Hiroyuki Takada, Tokyo, Japan

[73] Assignee: Oki Electric Industry Co., Ltd., Tokyo, Japan

[21] Appl. No.: 812,923

[22] Filed: Mar. 10, 1997

[30] Foreign Application Priority Data

May 12, 1996 [JP] Japan ..................................... 8-150691

[51] Int. Cl.[6] ........................... H03K 19/094; G05F 1/10
[52] U.S. Cl. ........................................... 327/536; 327/537
[58] Field of Search .................................... 327/390, 530, 327/534, 535, 536, 537, 538, 541, 543, 589; 257/71, 300

[56] References Cited

U.S. PATENT DOCUMENTS

| | | | |
|---|---|---|---|
| 5,180,928 | 1/1993 | Choi ........................................ | 327/536 |
| 5,625,544 | 4/1997 | Kowshik et al. ........................ | 327/536 |
| 5,675,279 | 10/1997 | Fujimoto et al. ...................... | 327/536 |
| 5,734,290 | 3/1998 | Chang et al. ........................... | 327/536 |

FOREIGN PATENT DOCUMENTS

63-316510  12/1988  Japan .

*Primary Examiner*—My-Trang Nu Ton
*Attorney, Agent, or Firm*—Venable; Robert J. Frank; Michael A. Sartori

[57] ABSTRACT

In a voltage-boosting circuit, field-effect transistors are coupled in series between an input terminal and an output terminal, and are coupled in parallel to respective capacitors which are driven by two complementary clock signals. The gate and drain of each field-effect transistor are interconnected. The field-effect transistors are disposed in at least two separate wells in a semiconductor substrate. Each well is coupled to one of the electrodes of one of the field-effect transistors in the well, providing an appropriate back-gate bias for the field-effect transistors in the well.

19 Claims, 6 Drawing Sheets

PRIOR ART

FIG.8

PRIOR ART

FIG.9

PRIOR ART

MULTI-STAGE VOLTAGE-BOOSTING CIRCUIT WITH BOOSTED BACK-GATE BIAS

BACKGROUND OF THE INVENTION

The present invention relates to a multi-stage voltage-boosting circuit of the charge-pump type, more particularly to the back-gate biasing of transistors in such a voltage-boosting circuit.

Multi-stage voltage-boosting circuits are used, for example, to generate the high voltages needed for programming and erasing electrically-erasable programmable read-only memory (EEPROM) devices. A conventional voltage-boosting circuit of this type, which will be described in more detail later, comprises a plurality of field-effect transistors disposed in a common semiconductor substrate, and a like plurality of capacitors. The transistors are coupled in series, and the capacitors are coupled to respective transistors, each transistor-capacitor pair forming one stage of the circuit. The capacitors are driven by two complementary clock signals in such a way that charge is pumped through the circuit with a voltage boost in each stage.

A problem in the conventional circuit is that as all transistors in the series are formed in the same substrate, due to the voltage boosting, the back-gate bias of the transistors becomes progressively deeper in later stages of the circuit. The increased back-gate bias leads to progressively larger voltage drops in the transistors, thereby increasing the number of stages needed to produce a given boosted output voltage. Eventually the back-gate bias becomes so great that the voltage drop equals the voltage boost in each stage, setting an absolute upper limit on the attainable output voltage, unless the voltage swing of the complementary clock signals is increased. The conventional voltage-boosting circuit thus takes up much space, requires comparatively high-voltage clock signals, and has a limited voltage-boosting capability.

SUMMARY OF THE INVENTION

One object of the present invention is to reduce the size of a multi-stage voltage-boosting circuit.

Another object of the invention is to increase the voltage-boosting capability of a multi-stage voltage-boosting circuit.

A further object is to reduce the voltage of the clock signals needed to drive a multi-stage voltage-boosting circuit.

The invented voltage-boosting circuit has a plurality of capacitors, and a like plurality of field-effect transistors disposed in a plurality of distinct wells of one conductive type in a semiconductor substrate of another conductive type. Each well contains at least one of the field-effect transistors. The field-effect transistors are coupled in series between an input terminal and an output terminal. The drain electrode of each field-effect transistor is coupled to the gate electrode of the same field-effect transistor, to the source electrode of the next field-effect transistor in the series, and to the corresponding capacitor.

The capacitors are driven by two complementary clock signals, capacitors driven by one of the two complementary clock signals alternating with the capacitors driven by the other clock signal.

Each of the wells is coupled to an electrode of one of the field-effect transistors disposed in that well, thereby maintaining a fixed back-gate bias relationship between the potentials of the wells and the source, gate, and drain potentials of the field-effect transistors therein.

DETAILED DESCRIPTION OF THE INVENTION

Embodiments of the invention will be described below with reference to the attached illustrative drawings.

Figure 1:
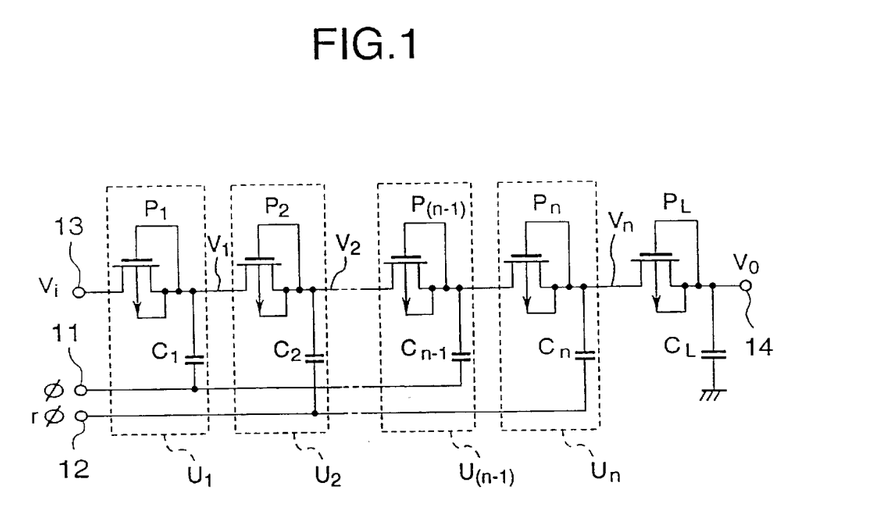
FIG. 1 is a circuit diagram of a first embodiment of the invention.

Referring to FIG. 1, the first embodiment is an n-stage voltage-boosting circuit with stages $U_1, U_2, \ldots, U_n$, where n is a positive even integer. The k-th stage comprises a P-channel metal-oxide-semiconductor field-effect transistor (hereinafter referred to as a PMOS transistor) $P_k$, and a capacitor $C_k$ (k=1, 2, . . . , n). The first embodiment also comprises one additional output PMOS transistor $P_L$ and output capacitor $C_L$. Each PMOS transistor has source, gate, and drain electrodes, which will be referred to below simply as the source, gate, and drain of the transistor.

Each PMOS transistor $P_k$ is disposed in a separate N-type well (hereinafter, N-well) in a P-type semiconductor substrate. The N-wells and substrate will be illustrated in FIG. 2. The drain of each PMOS transistor $P_k$ is coupled to the gate of the same PMOS transistor $P_k$, to the N-well in which PMOS transistor $P_k$ is disposed, to the corresponding capacitor $C_k$, and to the source of the next PMOS transistor $P_{k+1}$ (k=1, 2, . . . , n–1). The drain of the n-th PMOS transistor $P_n$ is coupled to the gate and N-well of PMOS transistor $P_n$, to the corresponding capacitor $C_n$, and to the source of the output PMOS transistor $P_L$. The drain of the output PMOS transistor $P_L$ is coupled to the gate and N-well of this PMOS transistor $P_L$ and to the output capacitor $C_L$. The symbol $V_k$ denotes the drain potential of the k-th PMOS transistor $P_k$, i.e. the output voltage of the k-th stage $U_k$ of the voltage-boosting circuit (k=1, 2, . . . , n).

Each capacitor $C_k$ (k=1, 2, . . . , n) is coupled between the drain of the corresponding PMOS transistor $P_k$ and one of two clock input terminals 11 and 12. The odd-numbered capacitors $C_1, C_3, \ldots, C_{n-1}$ are coupled to clock input terminal 11, and receive a clock signal $\phi$. The even-numbered capacitors $C_2, C_4, \ldots, C_n$ are coupled to clock input terminal 12, and receive a clock signal $\bar{\phi}$ which is complementary to clock signal $\phi$. The output capacitor $C_L$ is coupled between the drain electrode of the output PMOS transistor $P_L$ and ground, and is not driven by a clock signal.

The source of the first PMOS transistor $P_1$ is coupled to an input terminal 13 and receives a voltage Vi to be boosted. The drain of the output PMOS transistor $P_L$ is coupled to an output terminal 14 at which a boosted voltage Vo is output. The PMOS transistors $P_1, \ldots, P_k$ and $P_L$ are thus coupled in series between the input terminal 13 and output terminal 14.

Figure 2:
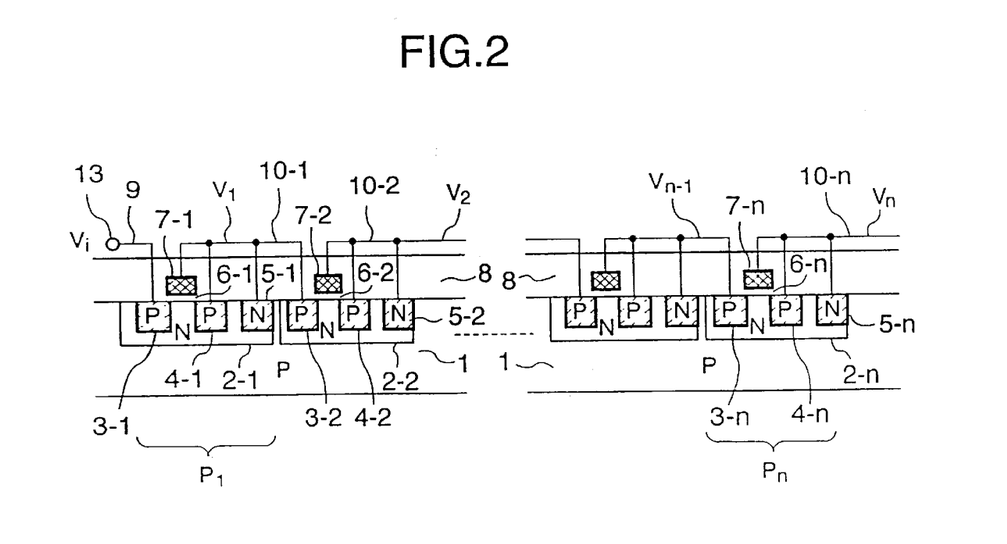
FIG. 2 is a sectional view of the transistors in the first embodiment.

Referring to FIG. 2, the voltage-boosting circuit as a whole is formed in a P-type semiconductor substrate material 1 with N-wells 2-1, 2-2, .... These N-wells are distinct areas of an N-type semiconductor material, separated from one another by the P-type substrate material 1. The k-th PMOS transistor $P_k$, disposed in the k-th N-well 2-k, comprises a P-type source diffusion 3-k, a P-type drain diffusion 4-k, an N-type diffusion 5-k, a gate insulation layer 6-k, and a polysilicon gate electrode 7-k (k=1, 2, ..., n).

The above elements are covered by an insulating layer 8, on which metal interconnecting lines are formed. One metal interconnecting line 9 couples the source 3-1 of the first PMOS transistor $P_1$ to the input terminal 13. Other metal interconnecting lines 10-k couple the drain 4-k, N-type diffusion 5-k, and gate 7-k of PMOS transistor $P_k$ to the source 3-(k+1) of the next PMOS transistor $P_{k+1}$.

The P-type and N-type diffusions 3-k, 4-k, and 5-k have a higher carrier concentration than the N-wells 2-k, as indicated by hatching. The high carrier concentration of the N-type diffusion 5-k permits an ohmic contact to be made with the metal interconnecting line 10-k.

Figure 3:
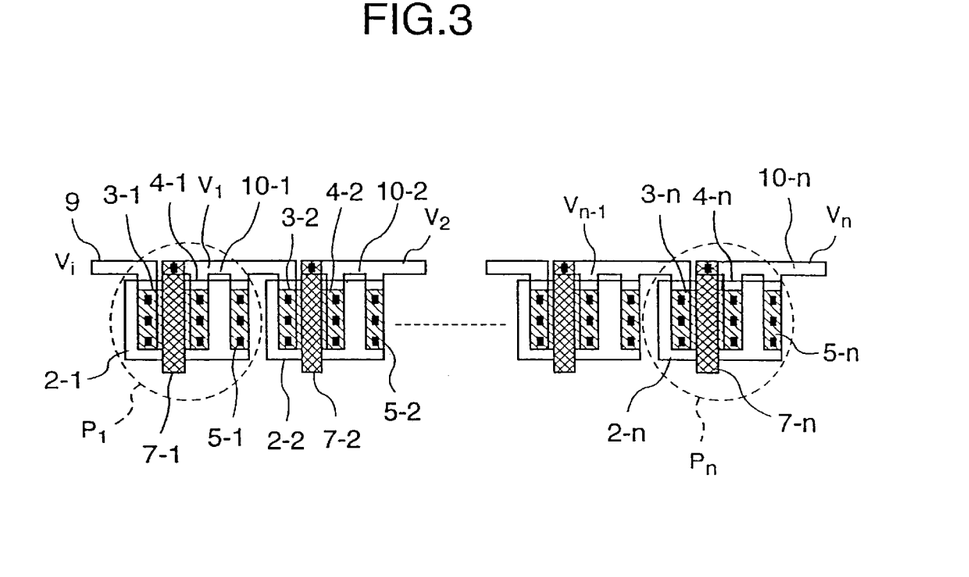
FIG. 3 is a plan view of the transistors in the first embodiment.

FIG. 3 shows this structure in plan view, using the same reference numerals as in FIG. 2. All of the PMOS transistors $P_k$ have the same structure (k=1, 2, ..., n).

Next, the operation of the first embodiment will be described. The symbol $VT_k$ denotes the threshold voltage of the k-th PMOS transistor $P_k$, i.e. the minimum source-gate voltage necessary for transistor $P_k$ to conduct. The symbol $VT_L$ denotes the threshold voltage of the output PMOS transistor $P_L$. The symbol $V\phi$ denotes the high level of the clock signals $\phi$ and r$\phi$, which exceeds $VT_1$. The low level of the clock signals is the ground level.

When clock signal $\phi$ is at the low level and clock signal r$\phi$ is at the high level, capacitor $C_1$ charges from the input terminal 13 through the first PMOS transistor $P_1$ until the gate and drain potentials $V_1$ of transistor $P_1$ have the following value:

$$V_1 = Vi - VT_1$$

Further charging of capacitor $C_1$ does not take place, because transistor $P_1$ turns off if its gate potential rises above this value.

When clock signal $\phi$ goes high and clock signal r$\phi$ goes low, the voltage across capacitor $C_1$ remains unchanged, so the drain potential $V_1$ of the first PMOS transistor $P_1$ is boosted to the following value:

$$V_1 = Vi - VT_1 + V\phi$$

This value exceeds the input voltage Vi (because $V\phi$ exceeds $VT_1$). Since the gate potential of PMOS transistor $P_1$ now equals or exceeds both the source and drain potentials of transistor $P_1$, transistor $P_1$ turns off, preventing capacitor $C_1$ from discharging to the input terminal 13. Instead, capacitor $C_1$ discharges through the second PMOS transistor $P_2$, charging the second capacitor $C_2$ and raising the drain potential $V_2$ of PMOS transistor $P_2$. If the attendant drop in $V_1$ is ignored, $V_2$ is raised to the following value:

$$V_2 = Vi - VT_1 + V\phi - VT_2$$

Next, clock signal $\phi$ goes low and clock signal r$\phi$ goes high, reducing potential $V_1$ and boosting potential $V_2$ as follows:

$$V_1 = Vi - VT_1 - \alpha$$

$$V_2 = Vi - VT_1 - VT_2 + 2V\phi$$

The value of $\alpha$ represents charge lost from the first capacitor $C_1$. $V_2$ now exceeds $V_1$, so the second PMOS transistor $P_2$ turns off.

The second capacitor $C_2$ then discharges through the third PMOS transistor $P_3$, charging the third capacitor $C_3$ and raising the drain potential $V_3$ of PMOS transistor $P_3$. If the attendant drop in $V_2$ is ignored, $V_3$ is boosted to the following value:

$$V_3 = Vi - VT_1 - VT_2 + 2V\phi - VT_3$$

During this time, the first transistor $P_1$ turns on again, allowing the first capacitor $C_1$ to charge from the input terminal 13, and restoring the value of $V_1$ from $Vi - VT_1 - \alpha$ to $Vi - VT_1$.

In this way, charge is pumped from one stage to the next, ultimately reaching the last stage $U_n$, which is driven by clock signal r$\phi$. When r$\phi$ is low, capacitor $C_n$ is charged through PMOS transistor $P_n$ until the drain potential $V_n$ of transistor $P_n$ reaches the following value:

$$V_n = Vi + (n-1)V\phi - (VT_1 + VT_2 + \ldots + VT_n)$$

When clock signal r$\phi$ goes high, the drain potential of PMOS transistor $P_n$ is boosted to the following value:

$$V_n = Vi + nV\phi - (VT_1 + VT_2 + \ldots + VT_n)$$

The output capacitor $C_L$ is charged from this potential through the output PMOS transistor $P_L$. The output voltage Vo therefore reaches the following value:

$$Vo = Vi + nV\phi - (VT_1 + VT_2 + \ldots + VT_n) - VT_L$$

As noted above, the PMOS transistors $P_k$ are all structurally identical (k=1, 2, ..., n). Moreover, since the drain of each transistor $P_k$ is coupled to the N-well 2-k in which the transistor $P_k$ is disposed, the potential relationships among the source, gate, drain, and N-well are the same for each transistor $P_k$. The PMOS transistors $P_k$ therefore all have the same back-gate bias relative to their source, gate, and drain potentials. Their threshold voltages $VT_k$ consequently all have the same value VT, and the equation for the output voltage Vo can be written as follows.

$$Vo = Vi + n(V\phi - VT) - VT_L$$

It might be added that the biasing of N-well 2-k at the drain potential of PMOS transistor $P_k$, instead of the slightly higher source potential, reduces the threshold voltage VT by a certain amount, thereby enhancing the efficiency of the voltage-boosting circuit.

The PMOS transistors $P_k$ (k=1, 2, ..., n) and $P_L$ function as diodes, permitting current to flow toward the output terminal 14 but not toward the input terminal 13. The output transistor $P_L$ and output capacitor $C_L$ smooth out variations in the output voltage Vo, because the output capacitor $C_L$ is not pumped by either clock signal.

The value of VT is independent of the value of $V\phi$, depending only on the transistor geometry and fabrication process parameters. The first embodiment can operate efficiently at any value of $V\phi$ exceeding the transistor threshold voltage VT. If VT and $VT_L$ are both 0.6 volts and Vi and $V\phi$ are both three volts, for example, the first embodiment needs only eight stages to generate an output voltage exceeding twenty volts (Vo=21.6 volts). If $V\phi$ is reduced to 1.5 volts, an output voltage exceeding twenty volts can still be reached in twenty stages (Vo=20.4 volts).

The above description has been simplified by ignoring the decrease in $V_k$ that occurs when capacitor $C_k$ loses charge to capacitor $C_{k+1}$. When the circuit first starts operating, this decrease in $V_k$ is fairly big, but as the output voltage Vo approaches the value given by the equation above, the decrease in $V_k$ approaches zero.

The decrease in $V_k$ due to transfer of charge from capacitor $C_k$ to N-well 2-k has also been ignored, but if the capacitance of the capacitors $C_k$ is sufficiently greater than the capacitance of the N-wells 2-k, this decrease in $V_k$ is negligible.

The potentials of the N-wells 2-k are boosted together with the output potential of each stage. Once the N-wells 2-k have been charged, each N-well is at a higher potential than the P-type substrate material 1, and is therefore electrically isolated from the P-type substrate. The potential difference between the P-type substrate material 1 and N-wells 2-k increases in successive stages, which improves the electrical isolation between the P-type substrate and the N-wells in the later stages.

Next, a second embodiment will be described.

Figure 4:
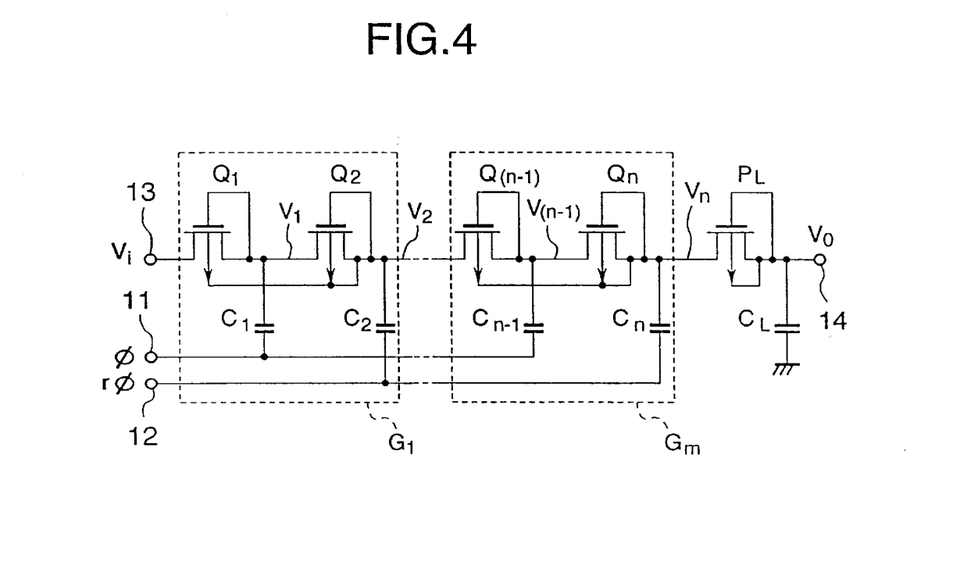
FIG. 4 is a circuit diagram of a second embodiment of the invention.

Referring to FIG. 4, the second embodiment has the same basic structure as the first embodiment, comprising PMOS transistors $Q_1, Q_2, \ldots, Q_n$ coupled to capacitors $C_1, C_2, \ldots, C_n$, with an additional output PMOS transistor $P_L$ and output capacitor $C_L$. The gate and drain of each PMOS transistor are interconnected, the PMOS transistors are coupled in series between an input terminal 13 and output terminal 14, and the capacitors are coupled to the drains of the corresponding PMOS transistors.

The PMOS transistors $Q_1, Q_2, \ldots, Q_n$ are now paired into groups of two, designated $G_1, \ldots, G_m$, where m=n/2. The two consecutive PMOS transistors in each group are formed in the same N-well, as will be shown below. The N-well is coupled to the drain of the second PMOS transistor in the well, e.g. the N-well containing PMOS transistors $Q_1$ and $Q_2$ is coupled to the drain of PMOS transistor $Q_2$.

Figure 5:
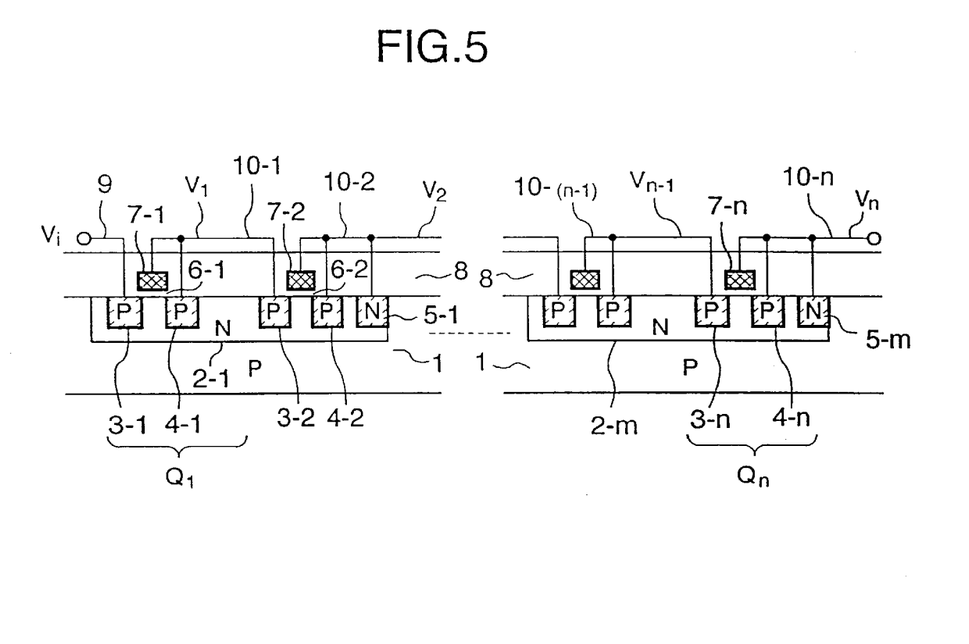
FIG. 5 is a sectional view of the transistors in the second embodiment.

FIG. 5 is a sectional view of PMOS transistors $Q_1$ to $Q_n$, using the same reference numerals as in FIG. 2, except that the N-wells are now numbered from 2-1 to 2-m, and the N-type diffusions from 5-1 to 5-m. The first two PMOS transistors $Q_1$ and $Q_2$ are formed in the first N-well 2-1, which is coupled by the N-type diffusion 5-1 and metal interconnecting line 10-2 to the drain 4-2 of PMOS transistor $Q_2$. The last two PMOS transistors $Q_{n-1}$ and $Q_n$ are formed in N-well 2-m, which is coupled by the N-type diffusion 5-m and metal interconnecting line 10-n to the drain 4-n of PMOS transistor $Q_n$. The odd-numbered metal interconnecting lines 10-1, 10-3, ..., 10-(n-1) do not make contact with N-type diffusions.

Figure 6:
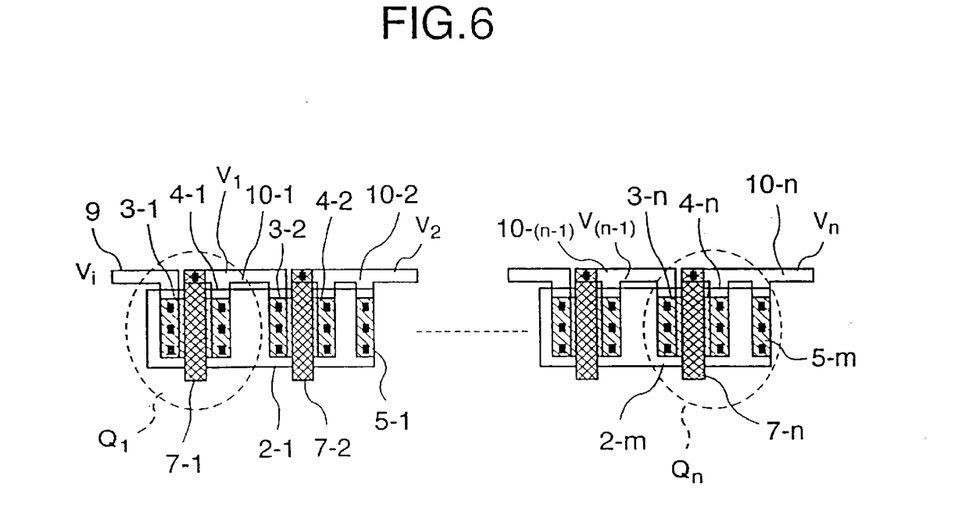
FIG. 6 is a plan view of the transistors in the second embodiment.

FIG. 6 shows this structure in plan view, using the same reference numerals as in FIG. 5.

The second embodiment is driven by complementary clock signals $\phi$ and $r\phi$ and operates in the same way as the first embodiment. Since the N-wells 2-1, ..., 2-m are biased at the drain potentials of the even-numbered PMOS transistors $Q_2, Q_4, \ldots, Q_n$, the threshold voltages of the even-numbered PMOS transistors have the same value VT as in the first embodiment. The threshold voltages VT' of the odd-numbered PMOS transistors $Q_1, Q_3, \ldots, Q_{n-1}$ are slightly higher, because the back-gate bias is higher in relation to the source, gate, and drain potentials of these transistors. The output voltage Vo is now given as follows:

$$Vo = Vi + m(2V_\phi - VT - VT') - VT_L$$
$$= Vi + (n/2)(2V_\phi - VT - VT') - VT_L$$

As one example, if $V\phi$ and Vi are three volts, VT and $VT_L$ are 0.6 volts, VT' is 0.8 volts, n is eight, and m is four, then Vo is 20.8 volts. Like the first embodiment, the second embodiment can boost an input voltage of three volts to an output voltage exceeding twenty volts in only eight stages, with three-volt clock signals.

The advantage of the second embodiment is that the voltage-boosting circuit takes up less space, because there are only half as many distinct N-wells 2-k that must be separated from one another, and only half as many N-type diffusions 5-k. The reduction in circuit area can be seen by comparing the layout in FIG. 6 with the layout in FIG. 3.

The value of VT' depends on the difference between the source potentials of the odd-numbered PMOS transistors and the potentials of the N-types wells, which are equal to the drain potentials of the even-numbered PMOS transistors. The value of VT' thus depends on the difference between the input voltage $V_{2h}$ and the output voltage $V_{2h+2}$ of group $G_h$, hence on the voltage swing $V\phi$ of the clock signals, as well as on transistor geometry and fabrication process parameters. The condition $V\phi > VT'$ must now be satisfied, as well as $V\phi > VT$.

The second embodiment can be varied by putting three or more consecutive PMOS transistors in each N-well. Further savings in space are then possible, but increased voltage drops occur in some of the PMOS transistors in each N-well, so there is a trade-off between circuit size and voltage-boosting efficiency. For example, if there are four PMOS transistors per N-well, and their threshold voltages are $VTG_1, VTG_2, VTG_3$, and $VTG_4$, the output voltage Vo will be given as follows:

$$Vo = Vi + (n/4)(4V\phi - VTG_1 - VTG_2 - VTG_3 - VTG_4) - VT_L$$

If the N-well is coupled to the drain of the fourth PMOS transistor, then $VTG_4$ will be equal to VT in the description above, and $VTG_3$ will be equal to VT', while $VTG_2$ and $VTG_1$ will be higher. The following relationship will hold:

$$VTG_1 > VTG_2 > VTG_3 > VTG_4$$

If too many PMOS transistors are placed in each N-well, the attendant saving in space may be offset by the need for additional stages to achieve the desired boosted voltage. In general, there will be an optimum number of transistors per well that achieves the desired boosted output voltage in the least total circuit area.

It is not necessary for all N-wells to contain the same number of transistors. Nor is it necessary for each well to be coupled to the drain of the last transistor disposed in the well. The well could be coupled to the source of that transistor, for example, or even to the source of the first transistor in the well. In general, a well can be coupled to any electrode of any one of the transistors in the well, provided the resultant back-gate bias enables all transistors to turn off when their connected capacitors are boosted by the clock signals.

Figure 7:
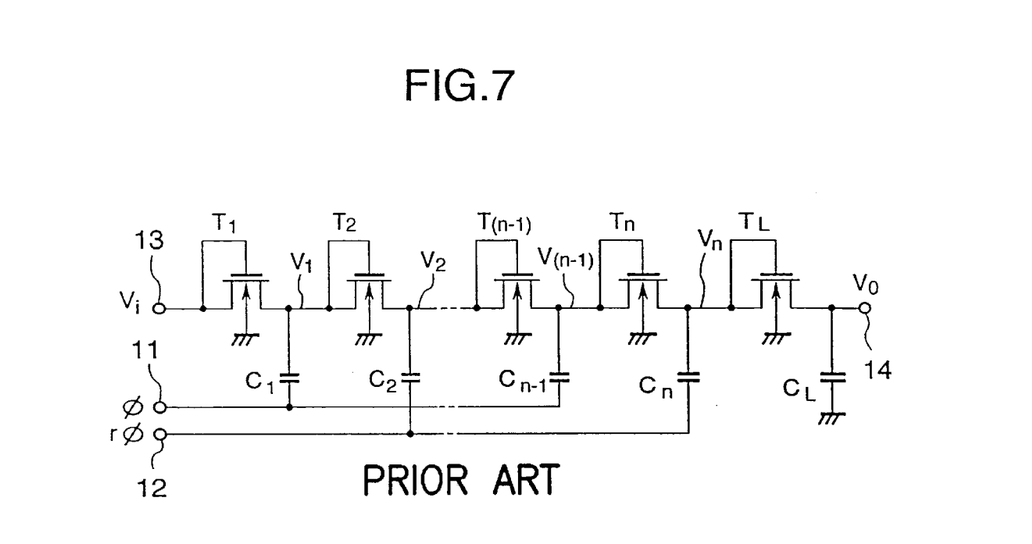
FIG. 7 is a circuit diagram of a conventional voltage-boosting circuit.

The effect of the invention can be better understood by comparison with the conventional voltage-boosting circuit shown in FIG. 7. The conventional circuit employs N-channel metal-oxide-semiconductor field-effect transistors (NMOS transistors) $T_1, T_2, \ldots, T_n$ which are coupled in series with an additional output NMOS transistor $T_L$ between the input terminal 13 and output terminal 14. The gate and drain of each NMOS transistor $T_k$ are interconnected. The source of each NMOS transistor $T_k$ is coupled to a capacitor $C_k$ (k=1, 2, ..., n). The capacitors $C_k$ are driven by complementary clock signals $\phi$ and r$\phi$ as in the embodiments above. The output NMOS transistor $T_L$ has interconnected gate and drain electrodes, and an output capacitor $C_L$ coupled to its source electrode. All of the transistors $T_1, T_2, \ldots, T_n$ and $T_L$ are formed in a single P-type substrate, which is biased at the ground level.

Figure 8:
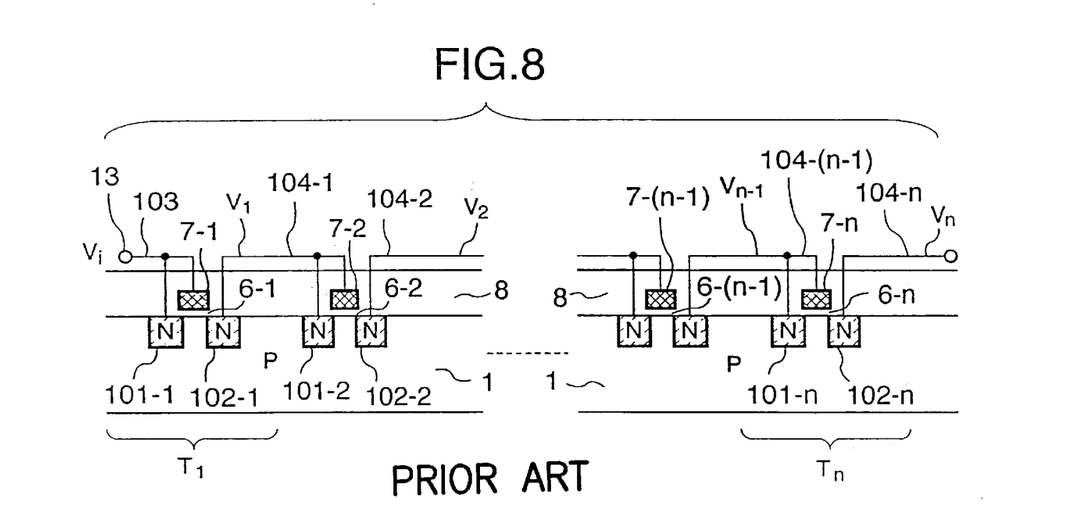
FIG. 8 is a sectional view of the transistors in the conventional voltage-boosting circuit.
Figure 9:
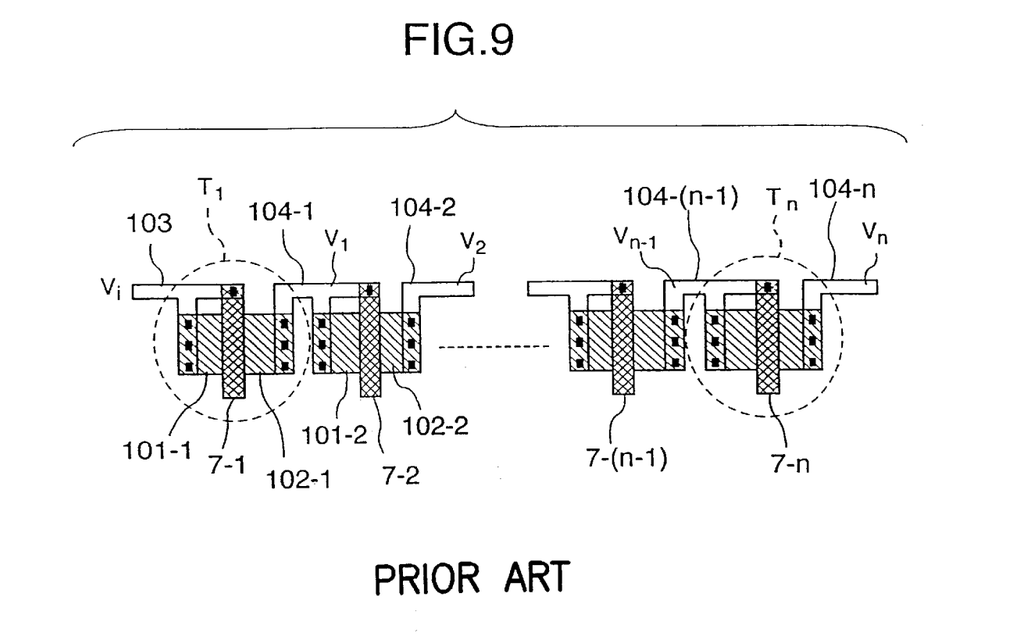
FIG. 9 is a plan view of the transistors in the conventional voltage-boosting circuit.

FIG. 8 shows the transistors $T_1, T_2, \ldots, T_n$ in sectional view, and FIG. 9 shows them in plan view, using the same reference numerals as in the preceding drawings to denote the P-type substrate material 1, gate insulating layers 6-k, gate electrodes 7-k, and insulating layer 8. Transistor $T_k$ has an N-type drain diffusion 101-k and an N-type source diffusion 102-k. The drain 101-1 and gate 7-1 of the first NMOS transistor $T_1$ are coupled by a metal interconnecting line 103 to the input terminal 13. The source 102-k of each NMOS transistor $T_k$ is coupled by a metal interconnecting line 104-k to the drain 101-(k+1) and gate 7-(k+1) of the next NMOS transistor $T_{k+1}$.

This conventional voltage-boosting circuit operates in the same way as the embodiments described above. If $VT_k$ denotes the threshold voltage of the k-th NMOS transistor $T_k$, and $VT_L$ the threshold voltage of NMOS transistor $T_L$, then the output voltage Vo has the following value:

$$Vo = Vi + nV\phi - (VT_1 + VT_2 + \ldots + VT_n) - VT_L$$

Since the source, drain, and gate potentials of the NMOS transistors become higher in each successive stage, while the back-gate potential remains at the ground level in all stages, the threshold voltages of the NMOS transistors increase as follows:

$$VT_1 < VT_2 < \ldots < VT_{n-1} < VT_n$$

As the threshold voltages of the transistors increase, successively larger voltage drops occur in the transistors, and the final output voltage Vo is lowered accordingly. If Vi and V$\phi$ are three volts, $VT_1$ is 0.6 volts, and $VT_k$ increases at one-twelfth the rate of increase of $V_k$, for example, then in an eight-stage voltage-boosting circuit of this conventional type, the output voltage Vo is only about 15.6 volts, instead of the 21.6 volts of the first embodiment or 20.8 volts of the second embodiment. Thirteen stages are needed to reach an output voltage exceeding twenty volts.

If V$\phi$ is reduced to 1.5 volts under these conditions, and the number of stages is increased to twenty, the output voltage of the conventional voltage-boosting circuit is only 10.6 volts, instead of the 20.4 volts of the first embodiment. Moreover, no matter how many stages are added, the conventional voltage-boosting circuit cannot reach an output voltage exceeding 12.3 volts, since at that point the transistor threshold voltage becomes equal to V$\phi$ (1.5 volts). To obtain an output voltage of twenty volts, V$\phi$ must be raised to at least 2.2 volts.

As this example shows, for a given output voltage, the invented voltage-boosting circuit allows the voltage of the clock signal to be lower than is possible in a conventional voltage-boosting circuit. Alternatively, for a given clock voltage and output voltage, the invented voltage-boosting circuit requires fewer stages than a conventional voltage-boosting circuit.

Figure 10:
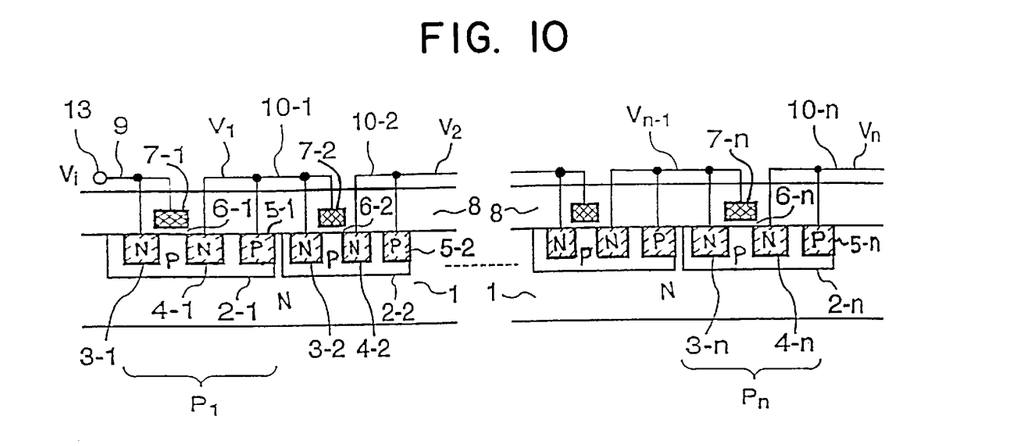
FIG. 10 is a sectional view of alternative transistors for FIG. 2 of the first embodiment.
Figure 11:
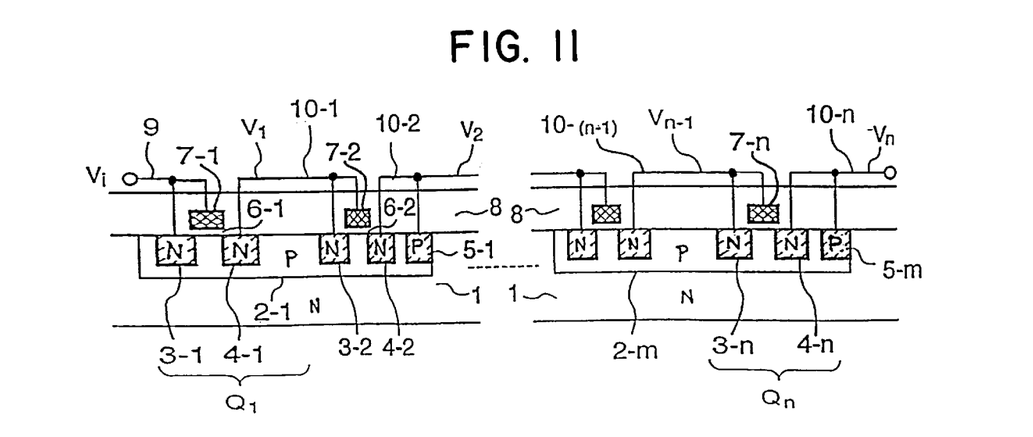
FIG. 11 is a sectional view of alternative transistors for FIG. 5 of the second embodiment.

The first and second embodiments used PMOS transistors to produce a boosted positive voltage, but the invention can also be practiced with NMOS transistors formed in P-type wells in an N-type semiconductor substrate to produce a negatively boosted voltage, such as minus twenty volts. These embodiments are illustrated in FIGS. 10 and 11, which mirror FIGS. 2 and 5, respectively.

The well in which the output transistor $P_L$ is disposed does not necessarily have to be coupled to the source or drain of transistor $P_L$.

In the first embodiment, the value of n can be any even or odd integer greater than one.

Those skilled in the art will recognize that further modifications are possible within the scope claimed below.

What is claimed is:

1. A voltage-boosting circuit comprising:

an input terminal;

an output terminal;

a semiconductor substrate comprising a semiconductor material of a first conductive type;

a plurality of wells of a second conductive type formed in said semiconductor material, said wells being separated by said semiconductor material;

a plurality of field-effect transistors formed in said wells and electrically coupled in series between said input terminal and said output terminal, at least one field-effect transistor being formed in each well, each field-effect transistor having a source electrode, a gate electrode, and a drain electrode, the gate electrode and the drain electrode of each field-effect transistor being electrically coupled, the source electrode or drain electrode of one field-effect transistor formed in each well further being electrically coupled to said well; and a plurality of capacitors, each capacitor being electrically coupled to a corresponding field-effect transistor, a first set of said capacitors being further coupled to a first clock signal, a second set of said capacitors being further coupled to a second clock signal, said second clock signal being complementary to said first clock signal.

2. The circuit of claim 1, wherein one field-effect transistor is formed in each well.

3. The circuit of claim 2, wherein each well is electrically coupled to the drain electrode of the field-effect transistor formed in said well.

4. The circuit of claim 2, wherein each well is electrically coupled to the source electrode of the field-effect transistor formed in said well.

5. The circuit of claim 1, wherein at least two field-effect transistors are formed in each well, said at least two field-effect transistors being coupled consecutively in said series.

6. The circuit of claim 5, wherein each well is electrically coupled to the drain electrode of a last field-effect transistor in said series formed in said well.

7. The circuit of claim 5, wherein each well is electrically coupled to the source electrode of a first field-effect transistor in said series formed in said well.

8. The circuit of claim 1, wherein said field-effect transistors are P-channel metal-oxide-semiconductor field-effect transistors.

9. The circuit of claim 8, wherein said semiconductor material of said first conductive type is a P-type semiconductor material, and said wells of said second conductive type are N-type wells formed in said P-type semiconductor material.

10. The circuit of claim 1, wherein said field-effect transistors are N-channel metal-oxide-semiconductor field-effect transistors.

11. The circuit of claim 10, wherein said semiconductor material of said first conductive type is an N-type semiconductor material, and said wells of said second conductive type are P-type wells formed in said N-type semiconductor material.

12. The circuit of claim 1, wherein each capacitor is electrically coupled to the drain electrode of said corresponding field-effect transistor.

13. The circuit of claim 1, wherein each capacitor is electrically coupled to the source electrode of said corresponding field-effect transistor.

14. A voltage-boosting circuit, comprising:

a semiconductor substrate having a first well, a second well, and a third well;

an input node receiving a predetermined voltage;

a first field-effect transistor formed in said first well and having a first electrode, a second electrode, and a first gate electrode, said first electrode being electrically coupled to said input node, and said first gate electrode being electrically coupled to said second electrode and to said first well;

a first capacitor having a first node and a second node, said first node being electrically coupled to said second electrode, and said second node for receiving a first clock signal;

a second field-effect transistor formed in said second well and having a third electrode, a fourth electrode, and a second gate electrode, said third electrode being electrically coupled to said second electrode, and said second gate electrode being electrically coupled to said fourth electrode and to said second well;

a second capacitor having a third node and a fourth node, said third node being electrically coupled to said fourth electrode, and said fourth node for receiving a second clock signal complementary to said first clock signal;

a third field-effect transistor formed in said third well and having a fifth electrode, a sixth electrode, and a third gate electrode, said fifth electrode being electrically coupled to said fourth electrode, and said third gate electrode being electrically coupled to said sixth electrode and to said third well;

a third capacitor having a fifth node and a sixth node, said fifth node being electrically coupled to said sixth electrode, and said sixth node for receiving a fixed voltage; and an output node electrically coupled to said sixth electrode for outputting a boosted output voltage.

15. The circuit of claim 14, wherein said semiconductor substrate is a P-type semiconductor material, said first, second, and third wells are N-type wells, and said first, second, and third field-effect transistors are P-channel metal-oxide-semiconductor field-effect transistors.

16. The circuit of claim 14, wherein said semiconductor substrate is an N-type semiconductor material, said first, second, and third wells are P-type wells, and said first, second, and third field-effect transistors are N-channel metal-oxide-semiconductor field-effect transistors.

17. A voltage-boosting circuit, comprising:

a semiconductor substrate having a first well and a second well;

an input node receiving a predetermined voltage;

a first field-effect transistor formed in said first well and having a first electrode, a second electrode, and a first gate electrode, said first electrode being electrically coupled to said input node, and said first gate electrode being electrically coupled to said second electrode;

a first capacitor having a first node and a second node, said first node being electrically coupled to said second electrode, and said second node for receiving a first clock signal;

a second field-effect transistor formed in said first well and having a third electrode, a fourth electrode, and a second gate electrode, said third electrode being electrically coupled to said second electrode, and said second gate electrode being electrically coupled to said fourth electrode and to said first well;

a second capacitor having a third node and a fourth node, said third node being electrically coupled to said fourth electrode, and said fourth node for receiving a second clock signal complementary to said first clock signal;

a third field-effect transistor formed in said second well and having a fifth electrode, a sixth electrode, and a third gate electrode, said fifth electrode being electrically coupled to said fourth electrode, and said third gate electrode being electrically coupled to said sixth electrode and to said second well;

a third capacitor having a fifth node and a sixth node, said fifth node being electrically coupled to said sixth electrode, and said sixth node for receiving a fixed voltage; and an output node electrically coupled to said sixth electrode for outputting a boosted output voltage.

18. The circuit of claim 17, wherein said semiconductor substrate is a P-type semiconductor material, said first and second wells are N-type wells, and said first, second, and third field-effect transistors are P-channel metal-oxide-semiconductor field-effect transistors.

19. The circuit of claim 17, wherein said semiconductor substrate is an N-type semiconductor material, said first and second wells are P-type wells, and said first, second, and third field-effect transistors are N-channel metal-oxide-semiconductor field-effect transistors.

* * * * *